United States Patent
Olgaard et al.

(10) Patent No.: US 10,084,555 B1
(45) Date of Patent: Sep. 25, 2018

(54) METHOD FOR ESTIMATING RECEIVER SENSITIVITY OF A DATA PACKET SIGNAL TRANSCEIVER

(71) Applicant: LitePoint Corporation, Sunnyvale, CA (US)

(72) Inventors: Christian Volf Olgaard, Saratoga, CA (US); Ke Liu, San Jose, CA (US); Ruizu Wang, San Ramon, CA (US)

(73) Assignee: LitePoint Corporation, Sunnyvale, CA (US)

( * ) Notice: Subject to any disclaimer, the term of this patent is extended or adjusted under 35 U.S.C. 154(b) by 65 days.

(21) Appl. No.: 15/464,607

(22) Filed: Mar. 21, 2017

(51) Int. Cl.
  *H04B 17/29* (2015.01)
  *H04B 17/318* (2015.01)
  *H04W 24/08* (2009.01)

(52) U.S. Cl.
  CPC .......... *H04B 17/29* (2015.01); *H04B 17/318* (2015.01); *H04W 24/08* (2013.01)

(58) Field of Classification Search
  None
  See application file for complete search history.

(56) References Cited

U.S. PATENT DOCUMENTS

| | | | |
|---|---|---|---|
| 8,780,966 B1 | 7/2014 | Olgaard et al. | |
| 2002/0170006 A1* | 11/2002 | Schaber | G01R 31/31727 714/724 |
| 2008/0129615 A1* | 6/2008 | Breit | G01R 29/105 343/703 |
| 2008/0186901 A1* | 8/2008 | Itagaki | H04W 92/18 370/315 |
| 2008/0287117 A1* | 11/2008 | Olgaard | H04B 17/0085 455/423 |
| 2012/0051224 A1 | 3/2012 | Olgaard et al. | |
| 2012/0231745 A1 | 9/2012 | Gregg et al. | |
| 2013/0301441 A1* | 11/2013 | Russell | H04W 24/06 370/252 |
| 2014/0194069 A1* | 7/2014 | Liu | H04W 24/00 455/67.14 |
| 2015/0036729 A1 | 2/2015 | Olgaard et al. | |
| 2017/0078031 A1 | 3/2017 | Olgaard et al. | |

OTHER PUBLICATIONS

International Searching Authority Search Report dated Jun. 21, 2018 for International Application No. PCT/US2018/022210, Applicant, LitePoint Corporation, (6 pages).
International Searching Authority Written Opinion dated Jun. 21, 2018 for International Application No. PCT/US2018/022210, Applicant, LitePoint Corporation, (8 pages).

* cited by examiner

*Primary Examiner* — Faruk Hamza
*Assistant Examiner* — Cassandra Decker
(74) *Attorney, Agent, or Firm* — McCracken & Gillen LLC

(57) ABSTRACT

A method for estimating receiver sensitivity of a radio frequency (RF) data packet signal transceiver device under test that relies upon beacon request and response data packets for enabling communication links.

20 Claims, 3 Drawing Sheets

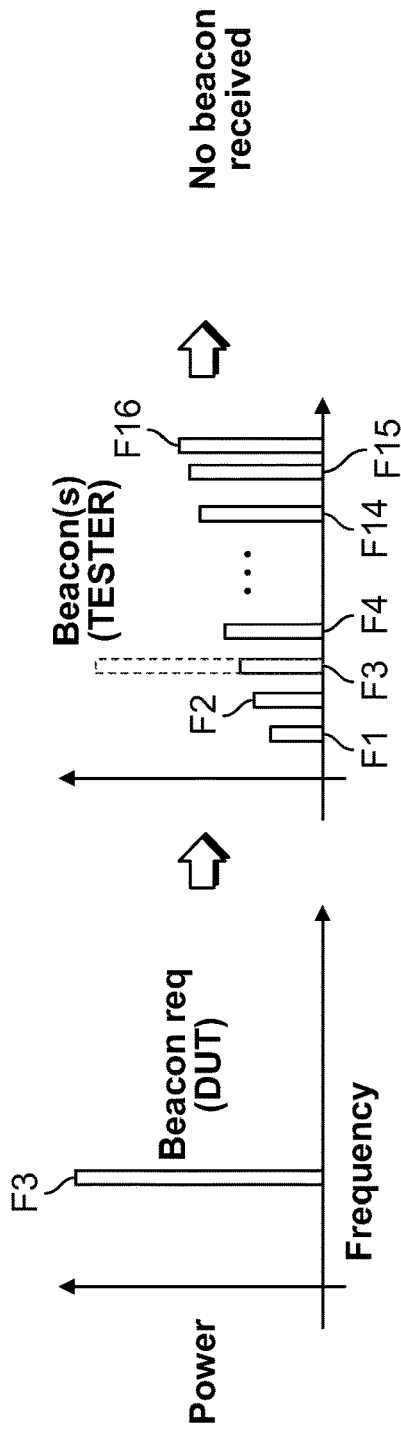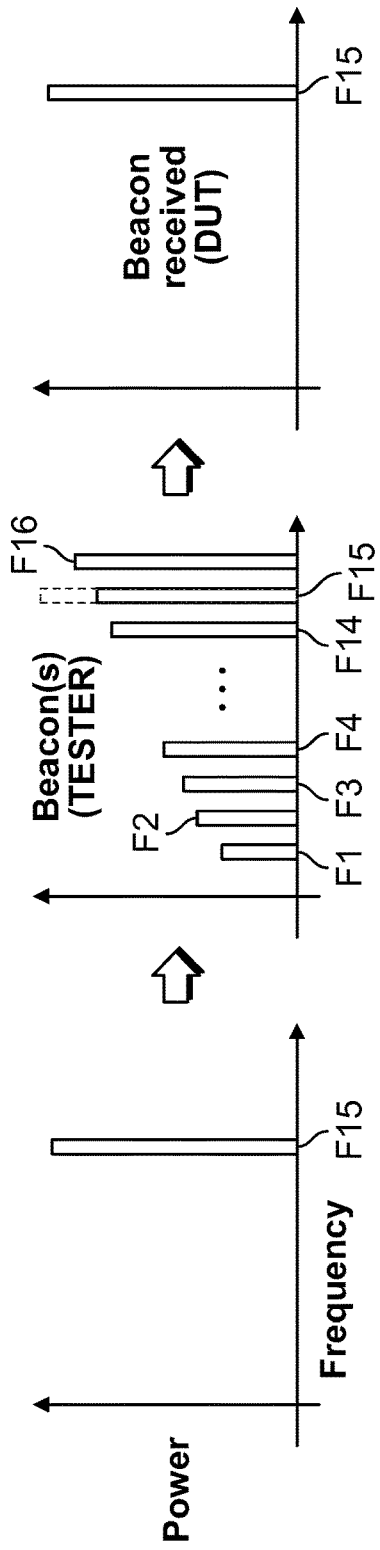
FIG. 3A
FIG. 3B

METHOD FOR ESTIMATING RECEIVER SENSITIVITY OF A DATA PACKET SIGNAL TRANSCEIVER

BACKGROUND

The present invention relates to testing of radio frequency (RF) data packet signal transceivers that rely upon beacon request and response data packets for establishing communication links, and in particular, to enabling rapid estimations of receiver sensitivity of such devices.

Many of today's electronic devices use wireless signal technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless signal technologies must adhere to various wireless signal technology standard specifications.

When designing such wireless devices, engineers take extra care to ensure that such devices will meet or exceed each of their included wireless signal technology prescribed standard-based specifications. Furthermore, when these devices are later being manufactured in quantity, they are tested to ensure that manufacturing defects will not cause improper operation, including their adherence to the included wireless signal technology standard-based specifications.

For testing these devices following their manufacture and assembly, current wireless device test systems typically employ testing subsystems for providing test signals to each device under test (DUT) and analyzing signals received from each DUT. Some subsystems (often referred to as "testers") include one or more vector signal generators (VSG) for providing the source, or test, signals to be transmitted to the DUT, and one or more vector signal analyzers (VSA) for analyzing signals produced by the DUT. The production of test signals by a VSG and signal analysis performed by a VSA are generally programmable (e.g., through use of an internal programmable controller or an external programmable controller such as a personal computer) so as to allow each to be used for testing a variety of devices for adherence to a variety of wireless signal technology standards with differing frequency ranges, bandwidths and signal modulation characteristics.

Testing of wireless devices typically involves testing of their receiving and transmitting subsystems. The tester will typically send a prescribed sequence of test data packet signals to a DUT, e.g., using different frequencies, power levels, and/or modulation technologies, to determine if the DUT receiving subsystem is operating properly. Similarly, the DUT will send test data packet signals at a variety of frequencies, power levels, and/or modulation technologies to determine if the DUT transmitting subsystem is operating properly.

One technique includes use of conductive signal paths (e.g., cables to convey the RF signals between the device RF ports and the tester RF ports) to simulate various channel conditions. However, testing a device using conductive signal paths prevents inclusion of its antenna subsystems as part of the test(s), thereby enabling verification of correct operation of a partially assembled device but not of the fully assembled device, i.e., with its antennas. Hence, in order to test a fully assembled device using real-world conditions, radiated signals must be transmitted between the antennas or antenna elements of an antenna array of the device and the antenna(s) of the test system. (Various systems and methods for testing in wireless signal environments are described in U.S. Pat. Nos. 8,811,461 and 8,917,761, and U.S. patent application Ser. Nos. 13/839,162, 13/839,583, 13/912,423, 14/461,573 and 15/197,966, the disclosures of which are incorporated herein by reference.)

While wireless, or radiative, signal environments enable more complete testing at the fully assembled system level, they can also include other or additional challenges. For example, in the case of rapidly growing "Internet of things" (IoT) technology, many IoT devices tend to communicate exclusively via wireless signals and do so with strict, i.e., low, power budgets, which often translates to infrequent communication intervals and limited opportunities to initiate them. Also, with some such, or similar, devices, for communications to occur it is first necessary to "pair" two compatible devices, e.g., by exchanging beacon signals identifying their readiness and abilities to communicate.

For example, Zigbee systems typically require an end-node device and a coordinator device to first be in respective pairing modes of operation. The end-node device sends a beacon request on each of the supported communication channels (e.g., up to 16 for Zigbee) one by one, waits after each beacon request transmission for a predetermined time interval to receive a beacon response, and then moves to the next channel if no response is received. This sequence of beacon request transmissions is done only once or twice, so testing receiver sensitivity of an end-node device is difficult since a tester would traditionally wait on one of the supported channels and then reply with a beacon response if and when a beacon request is received on that channel. Thus, only a single sensitivity power level can be tested, and with the end-node device only doing this once or twice, only one or two sensitivity power levels can be tested.

SUMMARY

A method for estimating receiver sensitivity of a radio frequency (RF) data packet signal transceiver device under test that relies upon beacon request and response data packets for enabling communication links.

In accordance with an exemplary embodiment of the presently claimed invention, a method for estimating receiver sensitivity of a data packet signal transceiver device under test (DUT) includes:

receiving, with a tester from a DUT, a wireless DUT beacon signal including a beacon request data packet and having one of a plurality of nominal DUT beacon signal frequencies;

transmitting, with said tester in response to reception of said wireless DUT beacon signal, a plurality of wireless tester beacon signals having a plurality of respective beacon data packets and a plurality of nominal tester beacon signal frequencies and power levels, wherein said plurality of nominal tester beacon signal frequencies includes a plurality of different nominal frequencies including lowest and highest nominal frequencies; and if no DUT acknowledgment signal corresponding to one of said plurality of wireless tester beacon signals is received by said tester, then further receiving, with said tester from said DUT, another wireless DUT beacon signal including a beacon request data packet and having one of said plurality of nominal DUT beacon signal frequencies, further transmitting, with said tester in response to reception by said tester of said another wireless DUT beacon signal, said plurality of wireless tester beacon signals with a plurality of increased nominal tester beacon signal power levels, and repeating, with one or more further pluralities of further successively increased nominal tester beacon signal power levels, said further receiving and said further transmitting until said tester receives a DUT acknowledgment signal corresponding to one of said plurality of wireless tester beacon signals.

In accordance with another exemplary embodiment of the presently claimed invention, a method for estimating receiver sensitivity of a data packet signal transceiver device under test (DUT) includes:

receiving, with a tester from a DUT, a wireless DUT request signal including a request data packet and having one of a plurality of nominal DUT request signal frequencies;

transmitting, with said tester in response to reception of said wireless DUT request signal, one or more wireless tester response signals having one or more respective response data packets and one or more nominal tester response signal frequencies and power levels, wherein said one or more nominal tester response signal frequencies includes at least a nominal tester response signal frequency equal to said one of a plurality of nominal DUT request signal frequencies; and if no DUT acknowledgment signal corresponding to one of said one or more wireless tester response signals is received by said tester, then further receiving, with said tester from said DUT, another wireless DUT request signal including a request data packet and having another one of said plurality of nominal DUT request signal frequencies, further transmitting, with said tester in response to reception by said tester of said another wireless DUT request signal, another one or more wireless tester response signals having one or more respective response data packets, another one or more nominal tester response signal frequencies and one or more increased nominal tester response signal power levels, wherein said another one or more nominal tester response signal frequencies includes at least a nominal tester response signal frequency equal to said another one of a plurality of nominal DUT request signal frequencies, and repeating, with an additional one or more further successively increased nominal tester response signal power levels, said further receiving and said further transmitting until said tester receives a DUT acknowledgment signal corresponding to one of said another one or more wireless tester response signals.

BRIEF DESCRIPTION OF THE DRAWINGS

FIGS. 3A-3B depict exemplary instances of beacon request transmissions by a DUT, beacon data packets transmissions by a tester, and beacon acknowledgement transmissions by a DUT in accordance with exemplary embodiments of the presently claimed invention.

DETAILED DESCRIPTION

Figure 1:
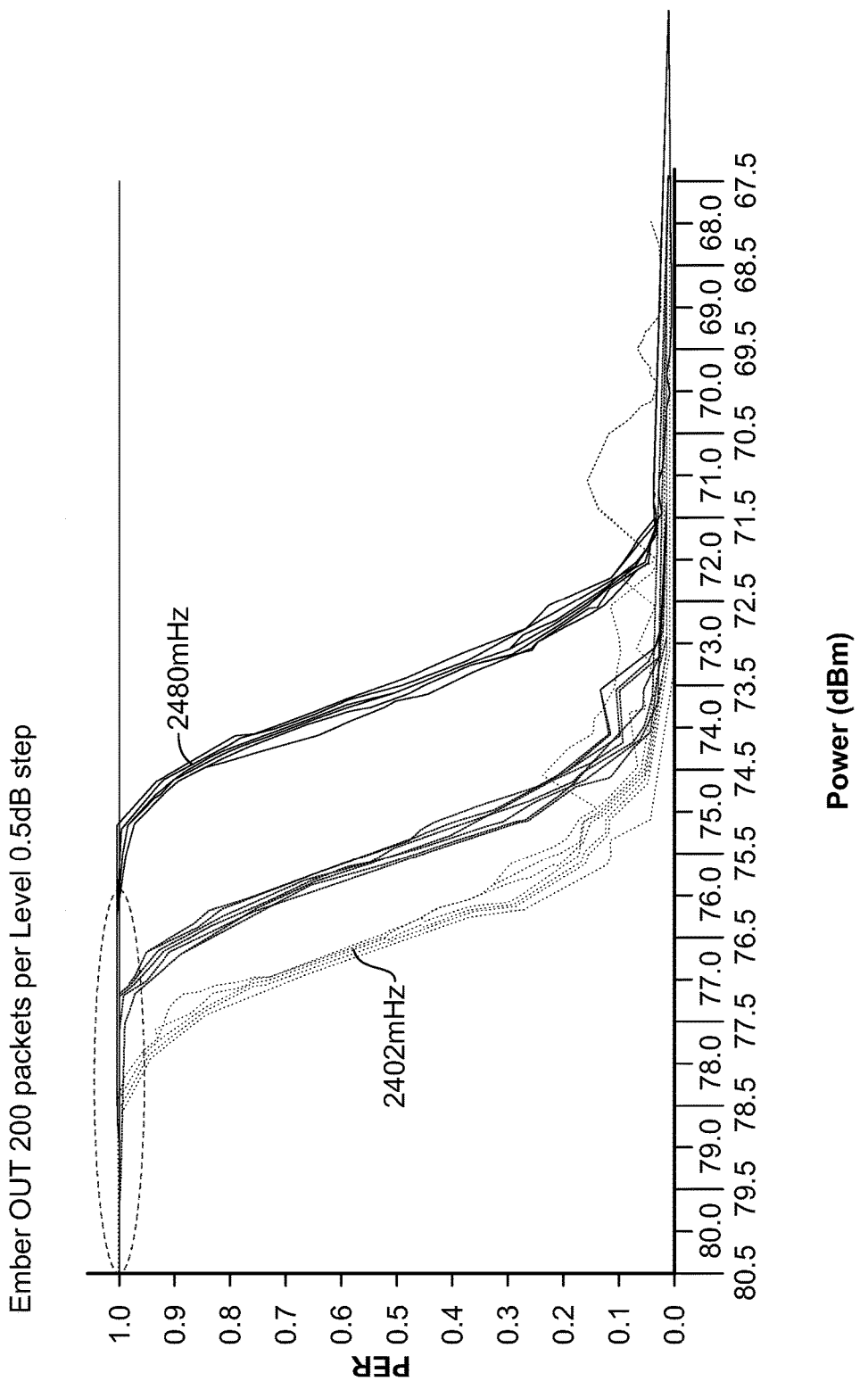
FIG. 1 depicts exemplary 0%-100% PER versus power level performances for a Zigbee device at different channel frequencies.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

Wireless devices, such as cellphones, smartphones, tablets, etc., make use of standards-based technologies (e.g., IEEE 802.11a/b/g/n/ac/ad, 3GPP LTE, Bluetooth, Zigbee, etc.). The standards that underlie these technologies are designed to provide reliable wireless connectivity and/or communications. The standards prescribe physical and higher-level specifications generally designed to be energy-efficient and to minimize interference among devices using the same or other technologies that are adjacent to or share the wireless spectrum.

Tests prescribed by these standards are meant to ensure that such devices are designed to conform to the standard-prescribed specifications, and that manufactured devices continue to conform to those prescribed specifications. Most devices are transceivers, containing at least one or more receivers and transmitters. Thus, the tests are intended to confirm whether the receivers and transmitters both conform. Tests of the receiver or receivers (RX tests) of a DUT typically involve a test system (tester) sending test packets to the receiver(s) and some way of determining how the DUT receiver(s) respond to those test packets. Transmitters of a DUT are tested (TX tests) by having them send packets to the test system, which then evaluates the physical characteristics of the signals sent by the DUT.

As discussed in more detail below, notwithstanding inherent statistical limitations on testing results due to the few times beacon requests are initiated, methods proposed in accordance with the presently claimed invention nonetheless enable more thorough tests. For example, in the case of Zigbee, the tester VSA is sufficiently broadband to monitor all possible beacon request signal frequencies and the tester VSG is sufficiently broadband to allow transmission of all 16 beacon response packets (one per ZigBee channel), thereby enabling a reply to the first packet transmitted by the DUT regardless of which channel it may be on. If the DUT sees the beacon response it can initiate the beacon process and effectively try once more if not successful or try again at a later time. Therefore, thermometer level increases are proposed, starting at a low average power when replying to the first beacon request, and then increasing the average power of the 16 response beacons power for the second beacon request, and so on for each of the remaining 14 request beacons. This enables rapid detection of the first power level at which the DUT accurately receives the beacon from the tester.

For example, if a 10 dB sensitivity range is expected, and to allow for statistical and wireless signal path loss variations, the first response beacon (from the tester) can be transmitted with a power level lower (e.g., at least 1 dB lower) than the lowest expected power level above which the DUT has a non-zero probability of receiving a packet and below which the DUT has a zero probability of receiving a packet (e.g., at the lowest expected power level corresponding to an expected packet error rate of 100%), following which successive transmission power levels can be stepped up in 1 dB increments through a power level 3 dB higher than the worst expected receiver sensitivity. This provides a full sweep of 16 power levels: 3 (3 dB lower than best expected receiver sensitivity)+10 (expected 10 dB sensitivity range)+3 (3 dB higher than worst expected receiver sensitivity)=16.

Further, this detection of the first power level at which the DUT accurately receives the beacon from the tester means that the tester also now knows the earlier, lower power levels before accurate reception by the DUT. This, in turn, further means that the power levels being used are on the packet error rate (PER) curve of the DUT, and statistically somewhere in the 100%-50% PER range, with the odds of this increasing if/when the DUT repeats its beacon request sequence, since PER decreases more rapidly with each unit power increase when moving toward and through the 50% PER toward 0%. (This discussed in more detail in U.S. Pat. No. 9,485,040, the disclosure of which is incorporated herein by reference.) Testing in this range should ensure that the power level at which a beacon acknowledgement is elicited from the DUT is determined more quickly.

Referring to FIG. 1, a typical Zigbee device has an approximately 5 dB power range, or window, over which its PER covers the full range of 0%-100%. For example, for beacon signals having a nominal signal frequency of 2480 MHz, the PER would be expected to be 0% at signal levels as low as −71.5 dBm, and then increase as power levels decrease until it becomes expected to be 100% at signal levels of −76.0 dBm and lower. (It should be noted that the absolute power levels as depicted here are not critical and are exemplary only, and take into account signal path losses and a DUT receiver sensitivity offset included for measurements for purposes of this example.) While this approximate 5 dB relative power range for 0%-100% PER is generally consistent over frequency, the absolute powers included vary due to differences in wireless signal path losses. For example, at the low end of the Zigbee frequencies, e.g., at a nominal 2402 MHz, this window, though generally consistent, occurs at lower power levels, e.g., expected PER values of 0% at signal levels of −73.0 dBm and higher, and 100% at signal levels of −78.0 dBm and lower.

Hence, by starting from lower power levels and stepping higher incrementally, a statistically better test results are obtained as packet errors can occur significantly above the traditional curve (i.e., at higher power levels), but are not likely below the minimum (i.e., 100% PER power). By sweeping from lower powers to higher powers, missing a response due to a missed packet becomes an accumulated statistical value, i.e., before a response can be missed in the "good" power range one must have previously missed a response at the lower power levels.

Figure 2:
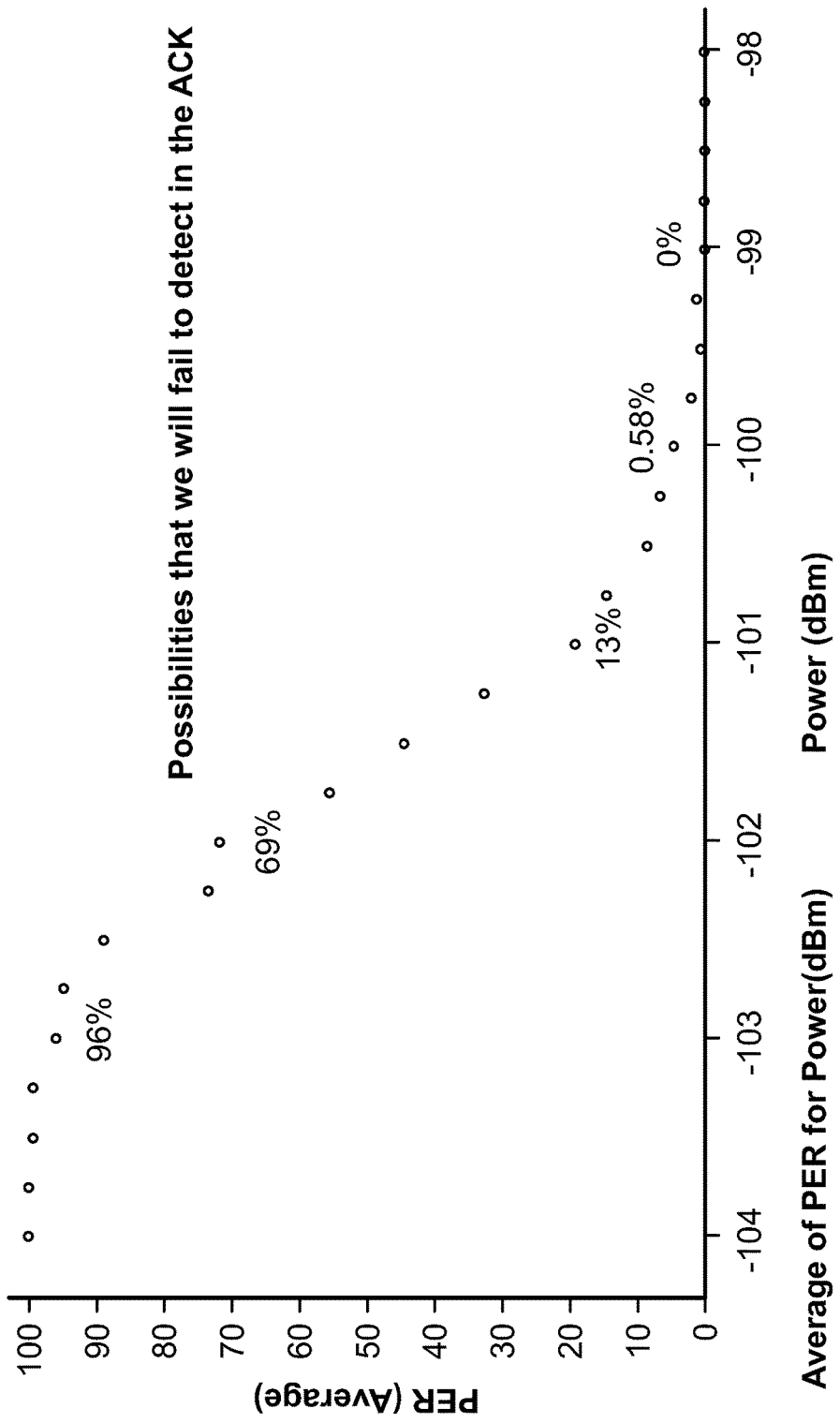
FIG. 2 depicts an exemplary average PER versus power level with expected chances of failures to respond to beacon requests.

Referring to FIG. 2, this general consistency of the 0%-100% PER curve enables its use in predicting probabilities of missing response beacons when sweeping power in 1 dB steps. (It should be noted that, unlike in FIG. 1, the absolute power levels as depicted here, while still exemplary, are more realistic in that signal path losses are included and no DUT receiver sensitivity offset is included.) For example, statistical chances of missing a response on the curve as shown are such that four out of 100 devices would respond to the first nonzero PER level (96% PER at −103 dBm) and only one in approximately 200 devices would fail to respond at a power level 3 dB higher (0.58% PER at −100 dBm). Hence, a 3 dB variation on repeated tests can be expected.

From this it can be seen that the presently claimed invention advantageously enables rapid estimations of PER, notwithstanding small sets of data samples, through the use of cumulative distribution functions. In other words, as described herein, receive sensitivity is a statistical analysis that can be terminated following reception of an acknowledgement signal ACK from the DUT indicating to the tester that a response beacon has been received. By successively increasing power levels of response beacons, from lower power levels virtually assured of producing 100% PER to higher power levels, effectively enable an accumulation of probabilities of reception. As a result, the real variation curve is actually steeper than the typical PER curve (assuming multiple levels inside the curve). For example, the actual curve may be at 90% PER for the first beacon power level, with 60% for the second and 30% for the third and so on, meaning that the probability of advancing to this third level is actually less than the estimated 30%, since it would have been necessary to not have received responses at both of the previous 90% and 60% levels.

Accordingly, while test results under these circumstances may not be as repeatable as generally desired, due to the few instances of beacon request transmissions as noted above, they nonetheless provide a very quick test to confirm whether the DUT appears to be generally operable as well as whether pairing between the DUT and tester appears to be operating. It is believed that a 3 dB statistical variation (2 sigma) can be achieved, and if 1 dB power increments are used as discussed above, a 4 dB statistical variation (3 sigma). It is further believed that even better results can be achieved with even smaller power increments, although with only 16 frequencies, or channels, available, known wireless signal path loss variations, and only two frequency sweeps by the DUT, such smaller power increments are likely more effective if used for the second sweep. A decision to use such variable power increments can be made in real time during testing by the tester.

In addition to PER, the beacon request itself can be used by the tester VSA to test performance characteristics of the DUT transmitter subsystem.

As noted above, variations in wireless signal path losses with frequency are to be expected (the 16 channels are at different frequencies), but this can be easily compensated by adjusting the relative VSG power for each channel/frequency.

Referring to FIG. 3A, as discussed above, to initiate pairing, the DUT transmits a beacon request at one of the 16 nominal frequencies, e.g., F3. The tester receives this beacon request and responds with beacon data packets at each of the 16 nominal frequencies F1, F2, F3, . . . , F16. However, as discussed above, the nominal power level of the response packets, including adjustments (up or down) to compensate for their respective expected wireless signal path losses, is initially lower than the best expected receiver sensitivity, so the response packet at the current DUT beacon frequency F3 is not received by the DUT. As a result, pairing does not occur.

Referring to FIG. 3B, as further discussed above, the DUT continues transmitting beacon requests, in response to which the tester continues to respond to each beacon request with beacon data packets at each of the 16 nominal frequencies F1, F2, F3, . . . , F16, with incrementally increased power levels for each response. Here, finally in a response by the tester to a beacon request via the fifteenth channel/frequency F15, the tester signals have increased to a power level sufficient to enable their reception by the DUT. As a result, the DUT responds with an acknowledgement signal ACK and pairing between the DUT and tester can occur.

In this example, the relative signal power levels as depicted range from lower to higher over lower to higher frequencies, respectively, to compensate for expected wireless signal path losses. However, as will be readily appreciated by one of ordinary skill in the art, the relative signal powers can be varied as needed, e.g., with varying mutual power differences, non-uniform increasing or decreasing relative signal powers, etc., as necessary to provide the desired compensation for expected wireless signal path losses.

Referring again to FIG. 3A, as discussed above, when initiating pairing, the DUT transmits a beacon request at one of the 16 nominal frequencies, e.g., F3. In accordance with alternative embodiments of the presently claimed invention, the tester receives this beacon request and responds with one or more beacon data packets at fewer than all available nominal frequencies, e.g., at only the same nominal frequency F3. Also as discussed above, the nominal power level of the response packet(s), including adjustments (up or down) to compensate for expected wireless signal path losses, is/are initially lower than the best expected receiver sensitivity, so the response packet at the current DUT beacon frequency F3 is not received by the DUT. As a result, pairing does not occur.

Referring again to FIG. 3B, the DUT continues transmitting beacon requests, in response to which the tester continues to respond to each beacon request with one or more beacon data packets at fewer than all available nominal frequencies, e.g., at only the same nominal frequency as the DUT beacon request, with incrementally increased power level(s) for each response. As before, finally in a response by the tester to a beacon request via the fifteenth channel/ frequency F15, the tester signal(s) has/have increased to a power level sufficient to enable reception by the DUT. As a result, the DUT responds with an acknowledgement signal ACK and pairing between the DUT and tester can occur.

While testing under these circumstances may not normally produce precision results, due to the infrequent opportunities to elicit a beacon response from the DUT, they nonetheless do produce useful results for purposes of confirming that the DUT is substantially operational in its final assembled state of manufacturing. In any event, this technique does effectively ensure that the true PER is actually better than the level found in this type of test. For example, as discussed above, the PER power levels between the points at which 10% PER and 99.9% PER occur typically and consistently have a range of approximately 3.5 dB. Accordingly, it is known that DUT RX sensitivity level is better than the power level at which this test elicits the first acknowledgement signal ACK from the DUT plus 3.5 dB. In other words, the power level value at which the first ACK is received can be increased by a selected amount XX dB and "defined" as the sensitivity with the understanding that the actual sensitivity is better. While this may result in variations in the actual sensitivity, if this is compared with a typical PER test, which is performed not with a swept power but with a constant power for a predetermined number of packets (e.g., 1000 packets at x dBm), then variations in the actual sensitivity would be similar. For example, if testing is done 5 dB above the actual sensitivity, then DUT sensitivity can vary 5 dB with no variations in a pass/fail result. A 3 dB variation should result in a 0% PER difference, thereby producing essentially the same result. While plotting measured data should reveal variations, the quality of the test is similar since the single level PER masks the variations with a result of zero most of the time.

While the foregoing discussion addresses initiating pairing of devices with exchanges of beacon signals, it will be understood by one of ordinary skill in the art that the signal exchanges as described can also be used under other circumstances. For example, after devices have been paired but data exchanges have not yet taken place, it may be necessary to exchange other types of request and response signals between the paired devices to initiate data communications. Since device pairing has already occurred, such request and response signals can be exchanged at one single common carrier frequency at a time without need for transmission of multiple signals at multiple frequencies as depicted in FIGS. 3A and 3B. Meanwhile, while still increasing the power level of the response signal with each transmission, sensitivity of receiver circuitry can still be estimated as discussed above.

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for estimating receiver sensitivity of a data packet signal transceiver device under test (DUT), comprising:

receiving, with a tester from a DUT, a wireless DUT beacon signal including a beacon request data packet and having one of a plurality of nominal DUT beacon signal frequencies;

transmitting, with said tester in response to reception of said wireless DUT beacon signal, a plurality of wireless tester beacon signals each having a plurality of respective beacon data packets and each having a respective one of a plurality of nominal tester beacon signal frequencies and a respective one of a plurality of nominal tester beacon signal power levels, wherein said plurality of nominal tester beacon signal frequencies includes a plurality of different nominal frequencies including lowest and highest nominal frequencies; and if no DUT acknowledgment signal corresponding to one of said plurality of wireless tester beacon signals is received by said tester, then further receiving, with said tester from said DUT, another wireless DUT beacon signal including a beacon request data packet and having one of said plurality of nominal DUT beacon signal frequencies, further transmitting, with said tester in response to reception by said tester of said another wireless DUT beacon signal, said plurality of wireless tester beacon signals each with a respective one of a plurality of increased nominal tester beacon signal power levels, and repeating, with one or more further pluralities of further successively increased nominal tester beacon signal power levels, said further receiving and said further transmitting until said tester receives a DUT acknowledgment signal corresponding to one of said plurality of wireless tester beacon signals.

2. The method of claim 1, wherein:

said receiving, with a tester from a DUT, a wireless DUT beacon signal including a beacon request data packet and having one of a plurality of nominal DUT beacon signal frequencies comprises receiving a wireless DUT beacon signal having a first one of said plurality of nominal DUT beacon signal frequencies; and said further receiving, with said tester from said DUT, another wireless DUT beacon signal including a beacon request data packet and having one of said plurality of nominal DUT beacon signal frequencies comprises receiving a wireless DUT beacon signal having a second one of said plurality of nominal DUT beacon signal frequencies different from said first one of said plurality of nominal DUT beacon signal frequencies.

3. The method of claim 1, wherein:

said transmitting, with said tester in response to reception of said wireless DUT beacon signal, a plurality of wireless tester beacon signals having a plurality of respective beacon data packets and a plurality of nominal tester beacon signal frequencies and power levels comprises transmitting said plurality of wireless tester beacon signals via a radiative signal environment;

each of said plurality of nominal tester beacon signal power levels is attenuated by a respective one of a plurality of signal path losses during its transmission via said radiative signal environment; and respective differences in said attenuated nominal power levels among said plurality of wireless tester beacon signals are related to differences in corresponding ones of said plurality of signal path losses.

4. The method of claim 1, wherein said receiving, with a tester from a DUT, a wireless DUT beacon signal including a beacon request data packet and having one of a plurality of nominal DUT beacon signal frequencies and said further receiving, with said tester from said DUT, another wireless DUT beacon signal including a beacon request data packet and having one of said plurality of nominal DUT beacon signal frequencies together comprise receiving a plurality of sequential ones of said wireless DUT beacon signal with each one having a respectively different one of said plurality of nominal DUT beacon signal frequencies.

5. The method of claim 1, wherein said transmitting, with said tester in response to reception of said wireless DUT beacon signal, a plurality of wireless tester beacon signals each having a plurality of respective beacon data packets and a respective one of a plurality of nominal tester beacon signal frequencies and a respective one of a plurality of nominal tester beacon signal power levels comprises transmitting at least a portion of said plurality of wireless tester beacon signals simultaneously.

6. The method of claim 1, wherein said transmitting, with said tester in response to reception of said wireless DUT beacon signal, a plurality of wireless tester beacon signals each having a plurality of respective beacon data packets and a respective one of a plurality of nominal tester beacon signal frequencies and a respective one of a plurality of nominal tester beacon signal power levels comprises transmitting at least a portion of said plurality of wireless tester beacon signals sequentially.

7. The method of claim 1, wherein said transmitting, with said tester in response to reception of said wireless DUT beacon signal, a plurality of wireless tester beacon signals each having a plurality of respective beacon data packets and a respective one of a plurality of nominal tester beacon signal frequencies and a respective one of a plurality of nominal tester beacon signal power levels comprises transmitting at least a portion of said plurality of respective beacon data packets simultaneously.

8. The method of claim 1, wherein said transmitting, with said tester in response to reception of said wireless DUT beacon signal, a plurality of wireless tester beacon signals each having a plurality of respective beacon data packets and a respective one of a plurality of nominal tester beacon signal frequencies and a respective one of a plurality of nominal tester beacon signal power levels comprises transmitting at least a portion of said plurality of respective beacon data packets sequentially.

9. The method of claim 1, further comprising comparing a nominal tester beacon signal power level of one of said plurality of wireless tester beacon signals to a predetermined plurality of power levels.

10. The method of claim 1, further comprising, following reception by said tester of a DUT acknowledgment signal corresponding to one of said plurality of wireless tester beacon signals, comparing said nominal tester beacon signal power level of said one of said plurality of wireless tester beacon signals to a predetermined plurality of power levels.

11. The method of claim 1, wherein said transmitting, with said tester in response to reception of said wireless DUT beacon signal, a plurality of wireless tester beacon signals each having a plurality of respective beacon data packets and a respective one of a plurality of nominal tester beacon signal frequencies and a respective one of a plurality of nominal tester beacon signal power levels, comprises initiating said transmitting with each one of said plurality of nominal tester beacon signal power levels being less than a nominal power level expected to elicit a DUT acknowledgment signal.

12. The method of claim 1, wherein said repeating, with one or more further pluralities of further successively increased nominal tester beacon signal power levels, said further receiving and said further transmitting until said tester receives a DUT acknowledgment signal corresponding to one of said plurality of wireless tester beacon signals comprises accumulating a count of occurrences of said further receiving and said further transmitting before said tester receives the DUT acknowledgment signal corresponding to one of said plurality of wireless tester beacon signals.

13. The method of claim 1, wherein said transmitting, with said tester in response to reception of said wireless DUT beacon signal, a plurality of wireless tester beacon signals each having a plurality of respective beacon data packets and a respective one of a plurality of nominal tester beacon signal frequencies and a respective one of a plurality of nominal tester beacon signal power levels comprises transmitting each one of said plurality of wireless tester beacon signals at a respectively different one of said nominal tester beacon signal power levels at the respective one of said plurality of nominal tester beacon signal frequencies, wherein the respectively different nominal tester beacon signal power levels are successively incremented relative to an expected best DUT receiver sensitivity level.

14. The method of claim 13, wherein said further transmitting, with said tester in response to reception by said tester of said another wireless DUT beacon signal, said plurality of wireless tester beacon signals each with a respective one of a plurality of increased nominal tester beacon signal power levels comprises:
- if no DUT acknowledgment signal corresponding to one of said plurality of wireless tester beacon signals is received by said tester, further transmitting each one of said plurality of wireless tester beacon signals at respective successively increased nominal tester beacon signal power levels until the respective one of said nominal tester beacon signal power levels is equal to an expected worst DUT receiver sensitivity level at the respective one of said plurality of nominal tester beacon signal frequencies; and
- if said tester receives a DUT acknowledgment signal corresponding to one of said plurality of wireless tester beacon signals, ending the transmission of each one of said plurality of wireless tester beacon signals while each one of said nominal tester beacon signal power levels is less than said expected worst DUT receiver sensitivity level at the respective one of said plurality of nominal tester beacon signal frequencies.

15. The method of claim 1, wherein said repeating, with one or more further pluralities of further successively increased nominal tester beacon signal power levels, said further receiving and said further transmitting until said tester receives a DUT acknowledgment signal corresponding to one of said plurality of wireless tester beacon signals comprises further transmitting each one of said plurality of wireless tester beacon signals with a respective one of said nominal tester beacon signal power levels between expected best and worst DUT receiver sensitivity levels at the respective one of said plurality of nominal tester beacon signal frequencies.

16. A method for estimating receiver sensitivity of a data packet signal transceiver device under test (DUT), comprising:
- receiving, with a tester from a DUT, a wireless DUT request signal including a request data packet and having one of a plurality of nominal DUT request signal frequencies;
- transmitting, with said tester in response to reception of said wireless DUT request signal, one or more wireless tester response signals having one or more respective response data packets and a respective one or more nominal tester response signal frequencies and a respective one or more nominal tester response signal power levels, wherein said one or more nominal tester response signal frequencies includes at least a nominal tester response signal frequency equal to said one of a plurality of nominal DUT request signal frequencies; and
- if no DUT acknowledgment signal corresponding to one of said one or more wireless tester response signals is received by said tester, then
- further receiving, with said tester from said DUT, another wireless DUT request signal including a request data packet and having another one of said plurality of nominal DUT request signal frequencies,
- further transmitting, with said tester in response to reception by said tester of said another wireless DUT request signal, another one or more wireless tester response signals having one or more respective response data packets, a respective another one or more nominal tester response signal frequencies and a respective one or more increased nominal tester response signal power levels, wherein said another one or more nominal tester response signal frequencies includes at least a nominal tester response signal frequency equal to said another one of a plurality of nominal DUT request signal frequencies, and
- repeating, with an additional one or more further successively increased nominal tester response signal power levels, said further receiving and said further transmitting until said tester receives a DUT acknowledgment signal corresponding to one of said another one or more wireless tester response signals.

17. The method of claim 16, further comprising comparing a nominal tester response signal power level of one of said one or more wireless tester response signals to a predetermined plurality of power levels.

18. The method of claim 16, further comprising, following reception by said tester of a DUT acknowledgment signal corresponding to one of said another one or more wireless tester response signals, comparing said nominal tester response signal power level of said one of said another one or more wireless tester response signals to a predetermined plurality of power levels.

19. The method of claim 16, wherein said transmitting, with said tester in response to reception of said wireless DUT request signal, one or more wireless tester response signals having one or more respective response data packets and having respective one or more nominal tester response signal frequencies and respective tester response signal power levels, comprises initiating said transmitting with each one of said one or more nominal tester response signal power levels being less than a nominal power level expected to elicit a DUT acknowledgment signal.

20. The method of claim 16, wherein said repeating, with an additional one or more further successively increased nominal tester response signal power levels, said further receiving and said further transmitting until said tester receives a DUT acknowledgment signal corresponding to one of said another one or more wireless tester response signals comprises accumulating a count of occurrences of said further receiving and said further transmitting before said tester receives the DUT acknowledgment signal corresponding to the one of said another one or more wireless tester response signals.

* * * * *